United States Patent [19]
Woodworth et al

[11] 4,103,673
[45] Aug. 1, 1978

[54] NON-TRACKING SOLAR ENERGY CONCENTRATOR

[76] Inventors: Robert N. Woodworth, 2838 Graysby St., San Pedro, Calif. 90732; Ulf Brynjestad, 1047 W. Ashbridge La., Harbor City, Calif. 90710

[21] Appl. No.: 748,140

[22] Filed: Dec. 6, 1976

[51] Int. Cl.² .............................. F24J 3/02
[52] U.S. Cl. ........................... 126/271; 350/211; 237/1 A; 236/100
[58] Field of Search .......... 126/270, 271; 237/1 A; 350/211; 236/93 A, 100; 165/40

[56] References Cited

U.S. PATENT DOCUMENTS

| | | | |
|---|---|---|---|
| 1,853,480 | 4/1932 | Wheeler et al. | 126/271 |
| 1,971,242 | 8/1934 | Wheeler | 126/271 |
| 2,762,569 | 9/1956 | Caillol | 126/271 |
| 3,007,029 | 10/1961 | Levine | 236/100 |
| 3,898,979 | 8/1975 | Medico, Jr. | 126/271 |
| 3,915,148 | 10/1975 | Fletcher et al. | 126/271 |
| 3,951,129 | 4/1976 | Brantley, Jr. | 126/271 |
| 4,011,857 | 3/1977 | Rice | 126/271 |

*Primary Examiner*—John J. Camby
*Assistant Examiner*—Henry C. Yuen
*Attorney, Agent, or Firm*—Fulwider, Patton, Rieber, Lee & Utecht

[57] ABSTRACT

There is disclosed a nontracking solar energy concentrator which has a plurality of parallel flow channels receiving a heat exchange medium for absorption of incident solar energy. The solar energy is concentrated by a superimposed cylindrical Fresnel lens which directs a concentrated beam of incident solar energy to selected ones of the plurality of flow channels. The flow channels discharge into an outlet cross header through thermostatically controlled valves. Each valve includes a spring-biased valve closure member having a valve stem that extends toward the displacement member of a thermostatic actuator, but separated therefrom by an adjustably-fixed, spaced interval to provide a dead band in the temperature response of the valve. The valves are biased to a normally closed position and are opened by response of the thermostatic actuator which is supported in the respective flow channel of the concentrator. The concentrator thereby automatically responds to solar radiation to permit circulation of the heat exchange fluid only through the flow channels which are heated by the absorption of the incident solar energy that is concentrated and directed to their absorptive top surface by the Fresnel lens.

6 Claims, 8 Drawing Figures

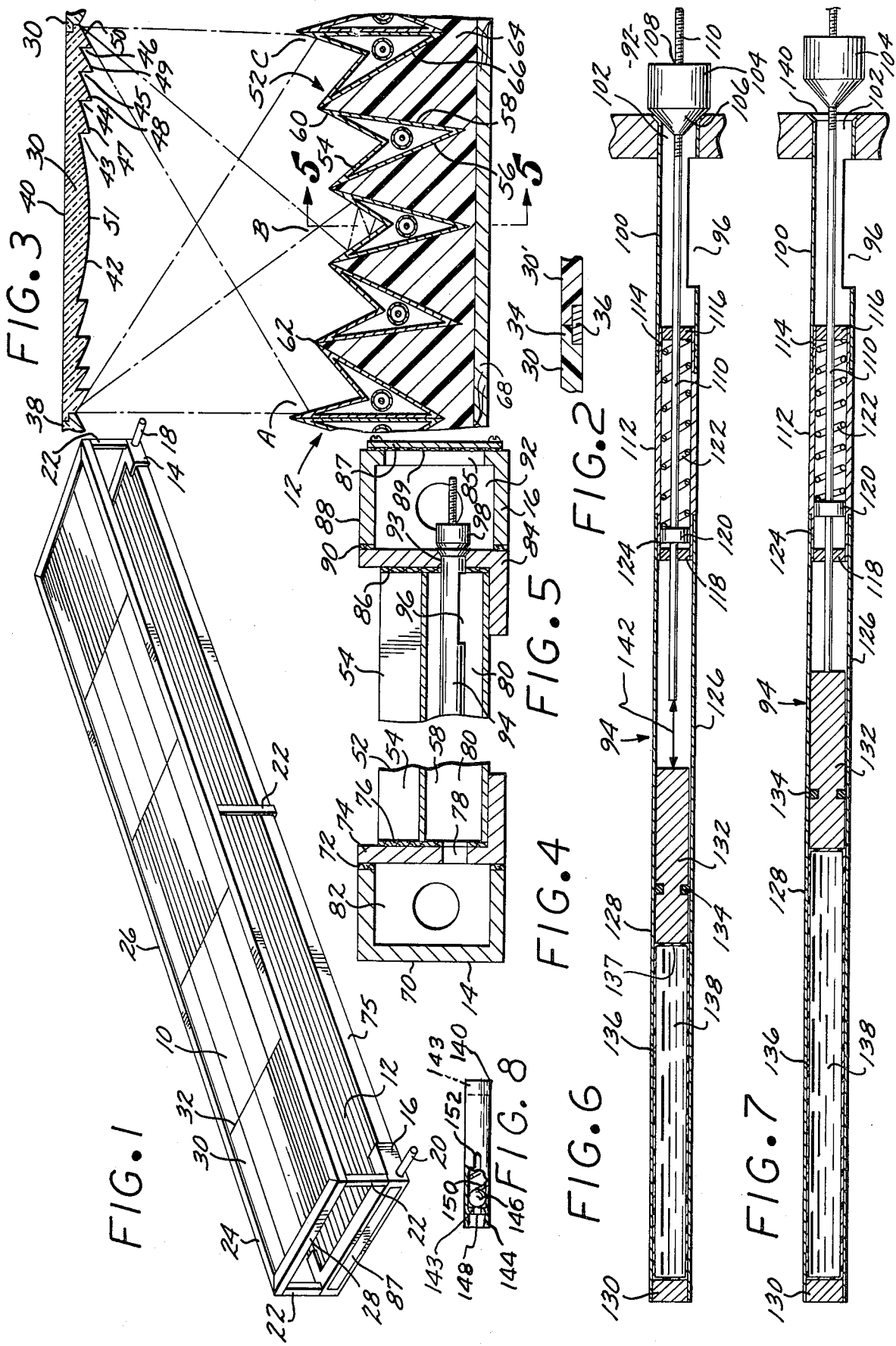

NON-TRACKING SOLAR ENERGY CONCENTRATOR

BACKGROUND OF THE INVENTION

1. Field of Invention

This invention relates to a solar energy concentrator and, in particular, to a solar energy concentrator of the non-tracking type having temperature responsive means for controlling the flow of heat exchange fluid therethrough.

2. Brief Statement of the Prior Art:

A number of designs have been developed for solar energy concentrators with the objective of focusing or concentrating incident solar energy onto a flow channel of lesser surface area. Radiant energy concentrating devices such as optical lens, mirrored reflectors and the like have been suggested for this purpose. Concentration of the incident solar energy is desirable to obtain higher working temperatures of the heat exchange fluid than possible with flat plate collectors, thereby permitting more efficient power extraction. Most solar concentrators are of the tracking variety in which a flow channel for the heat exchange fluid is supported at the focus of a lens or reflector and the assembly is mechanically actuated to track the incident angle of sunlight which continually varies with the season of the year and time of day.

A solar concentrator of the non-tracking type is disclosed in U.S. Pat. No. 3,915,148. In this concentrator, a plurality of parallel flow channels are supported beneath a cylindrical Fresnel lens which concentrates the incident solar energy into a narrow beam of concentrated light energy and directs the beam to selected ones of the subjacent flow channels. The beam of concentrated light energy shifts between adjacent flow channels in response to the change in the incident angle of sunlight.

While the aforementioned patent suggests a construction of a solar energy concentrator which eliminates the complex mechanism necessary for tracking the continually varying incident angle of sunlight, it creates another unsolved problem. This latter problem is the design of suitable valve means that can be mounted in each of the flow channels to permit flow through only the flow channel which receives the beam of concentrated light energy. For efficient operation of the solar energy concentrator, it is essential that the valves employed in the flow channels tightly seal the flow channels which are not receptive to the beam of concentrated solar energy. It is also necessary that the valves respond quickly to temperature changes of the heat exchange fluid as the respective flow channel is exposed to the beam of concentrated light energy.

BRIEF STATEMENT OF THE INVENTION

This invention comprises a solar energy concentrator of the non-tracking type having a plurality of heat exchange flow channels supported beneath a Fresnel lens which concentrates the incident solar energy and directs a concentrated light beam to selected ones of the flow channels. The flow channels of the concentrator are distally secured to cross headers which provide communicating apertures to each of the flow channels. The apertures of the outlet cross header are provided with the thermostatically actuated valves of the invention. Each flow channel is sealed, at its outlet port, by normally closed valve means having a thermostatic actuator suspended within the flow channel and mechanically coupled to the closure member of the valve with adjustable means to permit selection of the circulation temperature of the heat exchange medium. The preferred valve construction is a coaxial assembly of a plurality of tubular members including a valve body, spring housing and thermostatic actuator to provide an elongated tubular assembly which is supported by the apertured header wall and projects into the flow channel. The valve body has an aperture in its sidewall to provide an inlet port and its open end is secured to the header wall with a beveled lip to provide a tapered valve seat for the valve closure member. The latter is a plug having a generally conical seating surface and a central, internally threaded aperture which receives a threaded valve stem. The valve stem is received within the spring housing, passing through a central aperture of a spring retainer, and fixedly carries a second spring retainer. A helical coil compression spring is captured between the spring retainers to bias the closure member into a sealing position against the valve seat. The thermostatic actuator is distally carried by the spring housing and has a displacement member responsive to a thermally expansive material within the actuator to move into abutment with the valve stem and move the valve closure member into an open position against the bias of the spring. The spacing between the end of the valve stem and the displacement member is fixedly adjustable to provide a deadband in the response of the valve, thereby providing a fixed adjustability in the operating temperature of the concentrator.

BRIEF DESCRIPTION OF THE DRAWINGS

The invention will be described by the illustrated, preferred embodiment of which:

FIG. 1 is a perspective view of the solar concentrator of the invention;

FIG. 2 is a sectional view of a lens element support;

FIG. 3 is a cross-sectional end view of a portion of the concentrator;

FIGS. 4 and 5 are sectional elevational views of the inlet and outlet portions, respectively of the concentrator;

FIGS. 6 and 7 are sectional views of the thermostatic valve used in the invention; and FIG. 8 illustrates a useful check valve construction.

DESCRIPTION OF PREFERRED EMBODIMENTS

Referring now to FIG. 1, the solar concentrator comprises a lens panel 10 and a subjacent heat exchange flow panel 12. The flow panel 12 is formed of a plurality of extruded metal channel units in side-by-side alignment and extending the full length of the panel. The flow panel assembly distally bears an inlet cross header 14 and an outlet cross header 16 having nozzles 18 and 20 for connection to conduits communicating with a source of a heat exchange fluid and with the energy recover facilities employed with the solar energy concentrator. A plurality of vertical posts 22 are provided at each corner of the concentrator and along the length thereof as necessary to support the lens panel 10. A frame 24 formed of longitudinal spars 26 and lateral spars 28 is carried on the vertical posts 22. A plurality of extruded plastic lens elements 30 are supported in the flat plane defined by frame 24. The lens elements are joined, end-to-end by support bars which span across the frame, between the longitudinal spars 26 at each of the joint lines 32. FIG. 2 illustrates this joint where the abuting ends of the lens elements 30 and 35 have a flat lip 34 which laps over the cross bar 36 that extends between the longitudinal spars of the frame.

Referring now to FIG. 3, the individual lens elements 30 of the lens panel 10 are joined to adjacent elements in a longitudinal joint 38 using a half lap joint wherein the adjoining panels have opposing lips. FIG. 3 also shows the cross-sectional lens configuration of the lens elements 30. Each element has a flat upper surface 40 and a multifacited undersurface 42 which has a plurality of stepped zones defined by parallel grooves 43–46 which form facets 47–50, each of which has a cylindrical undersurface and each of which is capable of serving as a refractory lens for bending light and focusing the light energy into a narrow beam. The central portion 51 of each lens element also has a cylindrical undersurface to function as a refractory lens. As well known in Fresnel lens construction, the width of the facets or zones of each lens element progressively decreases in the lateral directions.

The flow channel plate 12 is defined by a plurality of flow channel units 52. Each unit comprises a plurality of V-shaped flow channels 54 which are defined by two, inclined and intersecting sidewalls 56 and 58 and a top wall 60 which has a V-shape. A plurality of the channel units 52 are aligned, side-by-side, to provide the flow channel plate 12 of the concentrator.

The lens elements 30 are molded plastic elements formed of plastics having suitable optical properties, e.g., acrylic, polycarbonate resins and the like. The lens are provided with optical finishes as can be achieved using conventional plastics molding technology. The flow channel units 52 can be formed of a single metal extrusion, e.g., an aluminum extrusion. Preferably, the edges of adjacent flow channels are secured together by a joint 62 which presents a minimal area, e.g., a line joint.

The units 52 are supported on a suitable insulating material 64 having a top surface with a contour of V-grooves 66 to receive the V-shaped flow channels. The insulating material can be any suitable thermally insulating solid closed cell cellular plastic foams such as polystyrene foam, polyurethene foam and the like are preferred. The V-grooves are preferably disposed on the top surface of the insulation 64 on a common radius, matching the radius of curvature of the cylindrical Fresnel lens elements 30, thereby insuring that the individual top surfaces 54 of the respective flow channels are equidistant from the Fresnel lens elements. The thermally insulating foam solid can be supported on a suitable backing plate 68.

FIG. 4 is a partial sectional view through the inlet cross header 14. This header is formed by channel 70 which is compressed against a sealing gasket 72 and the outboard face of angle member 74. The angle member 74 has an upright wall which is sealably secured against the open end of the flow channel unit 52 by gasket 76. The upright wall of angle member 4 has a plurality of apertures 78 which communicate from the chamber 82 to the interior passageway 80 of each flow channel.

Suitable check valve means can, if desired, be employed in apertures 78 to insure that the heat exchange fluid flow in the assembly is from chamber 82 to the respective flow channel passageway 80, thereby preventing any possible back mixing of fluid during its heating in the channel passageway 80.

The opposite end of the channel unit 54 is sealably secured against the upright wall of angle member 84 by gasket 86. The outboard face of this upright wall of angle member 84 is sealably engaged by channel member 88 with gasket 90 to define an outlet header chamber 92. The upright wall of angle member 84 also bears a plurality of apertures, one each positioned for communication with the channel fluid passageway 80. Each of the apertures receives a normally closed valve 94 having an inlet port 96 which communicates through the valve body to its open end which discharges into chamber 92 and which is sealably closed by the valve closure member 98.

Referring now to FIGS. 6 and 7, the valves 94 will be described in greater detail. As there illustrated, each valve is formed by a tubular valve body 100 having aperture means 96 in a sidewall to serve as a fluid inlet port and an open end 102 discharging into chamber 92 and serving as an outlet port. Each valve has a valve closure member 104, a generally plug-shaped member having a conical inboard end 106 and a central, internally threaded aperture 108. Aperture 108 threadably receives a distal portion of valve stem 110.

The valve body 100 distally bears a tubular spring housing 112 which has an end 114 of a slightly reduced diameter to be received within the inboard end of valve body 100. The spring housing has end plates 116 and 118 with central apertures for receiving valve stem 110. The valve stem 110 has a piston 120 fixedly secured thereto and a helical coil compression spring 122 is biased between end plate 116 and piston 120 to bias the valve closure member 104 into its closed position, as shown in FIG. 6.

The inboard end of spring housing 112 is of slightly reduced diameter to receive the end of the thermal actuator 126. The thermal actuator 126 is formed of a tubular member 128 having an end plate 130 and a displaceable member 132, e.g., a piston, slidably mounted therein. The displacement member 132 can have a peripheral groove for receiving a sealing means such as O-ring 134. The chamber 136 behind displaceable member 132 is filled with a thermally expansive material 138, e.g., oil, water, wax and the like. Preferably, the thermally expansive liquid 138 is contained within a sack 137 of an elastomeric material, e.g., rubber, Neopreme and the like, thereby insuring against leakage of this liquid.

The valve 94 is illustrated in FIG. 7 in its open position in which the valve closure member 104 has moved away from the tapered valve seat 140 which is formed about the open end 102 of the valve body 100. The valve closure member 104 is lifted from its closed position shown in FIG. 6 to the open position of FIG. 7 by the expansion of the thermally expansive liquid 138 which moves the displaceable member 132 sufficiently to abut this member against the inboard end of valve stem 110 and lift the valve closure member.

The valves 94 employed in the invention are provided with adjustment means whereby the temperature of response, i.e., opening of the valves is fixedly adjustable. This is accomplished by providing an adjustable, spaced interval 142 (see FIG. 6) between the inboard end of the valve stem 110 and the abuting end of displacement member 132. This spacing provides a deadband in the thermal response of the valve, requiring that the liquid 138 be raised to a preselected or threshold temperature before any actuation of the valve closure member occurs. The adjustability in the spaced interval 142 is accomplished by the threaded engagement of valve stem 110 with the valve closure member 104. The rotation of the valve closure member on valve stem 110 causes retraction or extension of the valve stem in the assembly, increasing or decreasing the magnitude of the dead band, i.e., space 142.

The entire assembly of inlet and outlet headers, angle members 74 and 84 and flow channel units is retained in the base frame which includes longitudinal frame members 75 (See FIG. 1). Tie rods or bolts can be provided to compress the assembly longitudinally, thereby tightly sealing gaskets 72, 76, 86 and 90. Access to outlet header 16 is provided by an opening 85 in the front face of the header which is covered by removable plate 87 and sealed by gasket 89, shown in FIGS. 1 and 5.

FIG. 8 illustrates a suitable check valve which can be mounted in aperture 78. The valve has a tubular housing 140 having opposite end plates 143. The end 144 of housing 140 is mounted in aperture 78 and its respective end plate has an aperture 148. A ball 146 is seated in aperture 148 by compression spring 150 and serves as a valve closure member. Fluid flow through the valve is unidirectional; through aperture 148, past ball 146 and out through slots 152 on opposite sides of housing 140.

In operation, the solar concentrator is placed with its longitudinal axis in a generally east-west alignment to receive incident sunlight on the flat lens panel 10. The Fresnel lens elements 30 are effective in focusing the received sunlight into a narrow beam such as identified by letters A, B and C in FIG. 3. The narrow band of concentrated light energy falls on one of the individual flow channels. The channels are flooded with the heat exchange fluid since the inlet apertures 78 are normally open to permit free flow into the flow channels but are closed at the outlet apertures 93 by their respective valves 94. When the concentrated light energy falls on the receptive surface 54 of one of the flow channels, the heat exchange fluid in the channel is rapidly heated, heating the thermally expansive liquid 138 within the thermal actuator of the valve 94. When the displaceable member 132 is moved in response to the expansion of the liquid 138 a sufficient degree to traverse the spaced interval 142 and abut against valve stem 110, any continued heating lifts the valve closure member 104 from the valve seat 140 of the valve 94, permitting the hot fluid to escape into the chamber 92 of the outlet cross header. The hot fluid is removed through nozzle 20 and appropriate conduits to heat recovery stages for the development of power, heat, or cooling therefrom. A suitable pump is used to return cold heat exchange fluid to inlet header 14, establishing circulation through the concentrator.

A typical solar concentrator can be constructed having the features shown in the figures with an area of approximately 10 square meters. The overall dimensions of this concentrator is 2 by 5 meters using a total of 100 lens elements 30 supported over 20, side-by-side disposed, flow channel units 52 which provide a total of 100 flow channels spanning the two meter width of the concentrator. At an incident solar flux of 1 Langley the outlet temperature of the heat exchange liquid is about 150° C at a flow rate of about 38 cm³/sec. A suitable heat exchange fluid for use in this application is a orthodichlorobenzene (Dowtherm E).

The invention has been described with reference to the illustrated and presently preferred embodiment. It is not intended that the invention be unduly limited by the illustrated embodiment. Instead, it is intended that the invention be defined by the means, and their obvious equivalents, set forth in the following claims.

What is claimed is:

1. A solar energy concentrator comprising:
    a lens element to receive incident solar energy and focus the received solar energy into a narrow, concentrated beam;
    a plurality of parallel flow channels having inlet and outlet ends and in side-by-side relationhsip beneath said lens element and oriented with respect thereto for reception of said concentrated beam of solar energy on respective ones of said flow channels;
    inlet cross header means in open communication to each of said flow channels to supply a heat exchange fluid to the inlet of said flow channels;
    outlet cross header means in communciation through outlet valve port means with each of said flow channels to remove heated heat exchange fluid from the other said flow channels;
    valve means in each of said flow channels including a tubular valve body having an open end received in said outlet cross header and positioned within its respective flow channel with inlet port means in the wall of said tubular member and valve seat means extending about the open end of each of said outlet port means, a valve closure member carried on a valve stem for movement between closed and open registration with said valve seat means;
    a coaxial tubular spring housing received on the inboard end of said valve body and bearing an end plate and receiving said valve stem with the latter fixedly carrying a piston;
    a helical coil spring received between said end plate and piston;
    thermostatic actuator means supported within its respective flow channel and including a displaceable member moveably responsive to temperature changes experienced by said thermostatic actuator and moveable into an abutment position with the received end of said valve stem to effect relative movement of said closure member; and
    adjustment means whereby the spacing between said displaceable member and the received end of said valve stem is adjustably variable to provide a controllable deadband in response of said valve closure member to temperature changes of said thermostatic actuator.

2. The solar concentrator of claim 1 wherein said flow channels have inclined, intersecting sidewalls and a V-shaped top surface for reception of said concentrated beam of solar energy.

3. The solar concentrator of claim 1 wherein said flow channels are mounted on a thermally insulating support.

4. The solar concentrator of claim 1 wherein said lens element is a cylindrical Fresnel lens.

5. The solar concentrator of claim 1 wherein said resilient means comprises a helical coil spring biased between a fixed position spring retainer secured to said valve body and a piston fixedly secured to said valve stem.

6. The solar concentrator of claim 1 wherein said thermostatic actuator comprises a tubular cylinder and piston motor actuator coaxially carried on the inboard end of said spring retainer and receiving the inboard end of said valve stem.

* * * * *